United States Patent [19]

Kamiguchi et al.

[11] Patent Number: 5,800,748
[45] Date of Patent: Sep. 1, 1998

[54] PRESSURE DATA DISPLAY METHOD FOR AN INJECTION MOLDING MACHINE

[75] Inventors: Masao Kamiguchi, Kawaguchiko-machi; Noriaki Neko, Oshino-mura; Kaoru Hiraga, Oshino-mura; Motohiro Nagaya, Oshino-mura, all of Japan

[73] Assignee: Fanuc Ltd., Yamanashi, Japan

[21] Appl. No.: 611,813

[22] Filed: Mar. 6, 1996

[30] Foreign Application Priority Data

Mar. 13, 1995 [JP] Japan .................................. 7-079317

[51] Int. Cl.$^6$ .................................................. B29C 45/77
[52] U.S. Cl. ...................... 264/40.1; 264/40.7; 425/145; 425/149
[58] Field of Search ........................ 405/145, 149; 264/40.1, 40.7

[56] References Cited

U.S. PATENT DOCUMENTS

| | | | |
|---|---|---|---|
| 3,750,134 | 7/1973 | Weisend | 425/145 |
| 3,932,083 | 1/1976 | Boettner | 425/145 |
| 4,774,675 | 9/1988 | Kagawa . | |
| 5,173,223 | 12/1992 | Kamiguchi et al. . | |
| 5,259,748 | 11/1993 | Neko et al. . | |
| 5,296,179 | 3/1994 | Kamiguchi et al. . | |
| 5,470,218 | 11/1995 | Hillman et al. | 425/145 |

*Primary Examiner*—Tim Heitbrink
*Attorney, Agent, or Firm*—Staas & Halsey

[57] ABSTRACT

A reference pressure waveform for injection molding operation is set in advance; pressures corresponding to the pressure waveform are detected with predetermined detection times during the injection molding operation; pressure deviations between pressure stored in the pressure waveform, corresponding to the detection times, and the detected pressures are obtained; and the pressure deviation for each detection time is graphically displayed on a display screen along with the reference pressure waveform.

16 Claims, 7 Drawing Sheets

| ADDRESS | IP i (REFERENCE PRESSURE) | MP i (PRESSURE DEVIATION) |
|---------|---------------------------|---------------------------|
| 1 | IP1 | MP1 |
| 2 | IP2 | MP2 |
| 3 | IP3 | MP3 |
| . | . | . |
| . | . | . |
| . | . | . |
| . | . | . |

PRESSURE DATA DISPLAY METHOD FOR AN INJECTION MOLDING MACHINE

BACKGROUND OF THE INVENTION

1. Field of the Invention

The present invention relates to a method for displaying on a display screen pressure data, such as injection pressure, back pressure, etc., during injection molding operation of an injection molding machine.

2. Description of the Related Art

Figure 7:
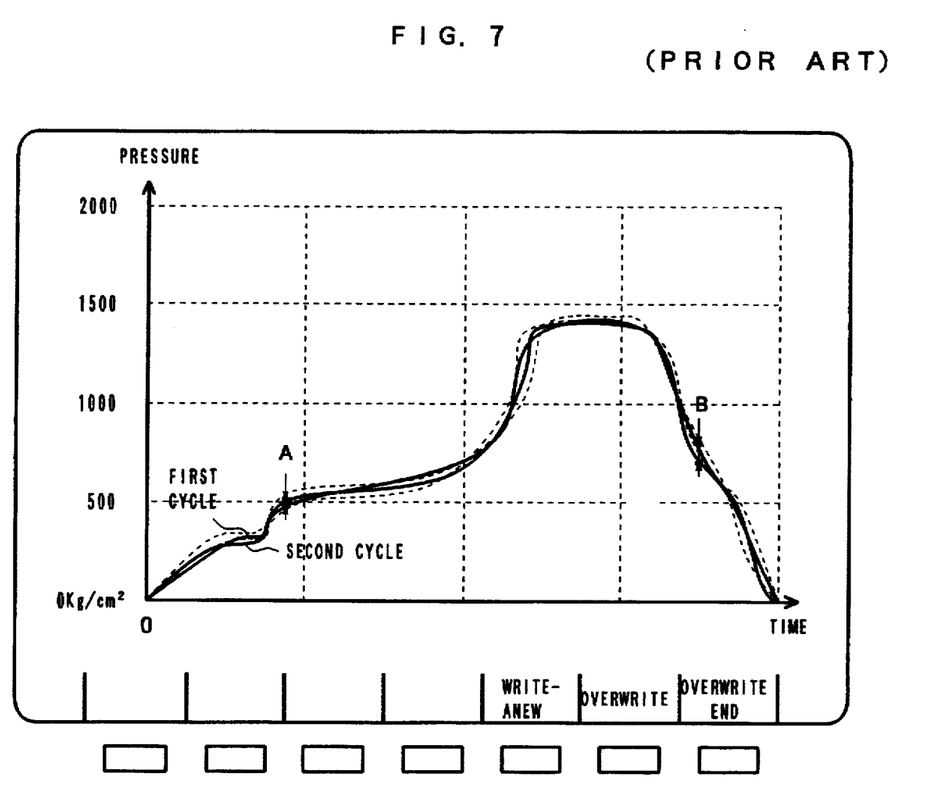
FIG. 7 is a diagram illustrating a monitor screen displaying a data by a conventional display method.

There is a known pressure data display method, in which, in order to detect faulty injection or measurement, the injection pressure or back pressure is sampled at every predetermined period so that it is graphically displayed on a screen on the basis of time series or screw position, and the pressure data in a plurality of injection molding cycles are displayed in the form of curves graphically superposed on one another. FIG. 7 shows examples of graphic displays for illustrating this method in which the injection pressure is sampled at every sampling period, and injection pressure curves for a plurality of injection molding cycles are displayed overlapping on one another.

In the pressure data display method shown in FIG. 7, functions "write-anew", "overwrite", and "overwrite end" can be freely selected by alternatively selecting function keys of a display device. The function "write-anew" is a function to erase and update the graphic display for the injection pressure at every molding cycle. The function "overwrite" is a function to make graphic displays for the injection pressure overlapping one another in a plurality of molding cycles. The function "overwrite end" is a function to suspend a renewal or additional display of pressure data for "write-anew" or "overwrite" and maintain the display state of the existing graph. Two full-line curves shown in FIG. 7 represent injection pressure data for two molding cycles displayed at a time by the function "overwrite".

If "overwrite" mode is continued as it is, a large number of pressure transition graphs (pressure curves) corresponding to the individual molding cycles will be displayed superposed on the foregoing two curves, as shown by broken lines in FIG. 7. The presence or absence of failures in the injection or metering can be detected by closely examining the dispersion of the superposed curves.

For example, if variations in the injection pressure are always remarkable and substantially same in size at the same detection time, it can be considered that injection failures may have been caused due to some permanent drawbacks in the die design or the like. If the variations in the injection pressure are remarkable and also fluctuate drastically, it can be considered that such injection failures may possibly have been caused by inappropriate setting of injection conditions. Even when the dispersion of the injection pressure is observed, if such dispersion is detected at different detection times, such dispersion may be considered to have been caused by partially poor plasticization of the resin or inclusion of foreign matter, and is not necessarily attributable to the defect in the construction of the die or inappropriate molding conditions.

The causes of the variation in the injection pressure as are described above are not always applicable equally to all dies or various combinations of molding conditions; however, in general, it can be said that, as long as the dispersion of injection pressure is detected, the information relation to the causes of abnormal injection or metering can be obtained by the operator, though the quality of such information may vary depending on the ability of the operator.

Accordingly, the legibility and resolution of graphs for displaying the variations in the injection pressure are the points to be considered. According to the conventional pressure data display method, the graphs are drawn by simply plotting detected values of the injection pressure or back pressure on the basis of a fixed pressure scale or a scale determined based on a preset maximum injection pressure, in order to display the whole of the graphs which represent changes in the injection pressure or back pressure, causing the problem that the scale order of the pressure display is too high to detect delicate pressure variations by comparing the graphs.

Furthermore, the configurations of the graphs themselves are complicated, and a large number of graphs are superposed on one another. In some cases, therefore, the pressure variations, that is, vertical deviations of the graphs, cannot be detected with accuracy. In the case shown in FIG. 7, for example, the variation in pressure at a point B is more remarkable than the pressure variation at a point A. However, as deviations in the directions normal to each graph at the respective positions of those points are substantially equal, the relative deviations look similar to each other. Thus, it is often difficult to objectively read differences in pressure.

OBJECT AND SUMMARY OF THE INVENTION

The object of the present invention is to provide a pressure data display method for an injection molding machine, which can accurately read the amount of a variation in pressure caused during injection molding operation and the time when the variations occurs and further, the time when the occurrence of repeated variations can be detected, without depending on scale setting for the graphic display of injection pressure.

According to the present invention, a reference pressure waveform for injection molding operation is determined in advance so that the pressure corresponding to the predetermined pressure waveform is detected at predetermined detection point during the injection molding operation, and pressure deviation between pressure stored with its pressure waveform corresponding to this detection time, and the detected pressures is obtained, and the pressure deviation at each detection time is graphically displayed on a display screen along with the reference pressure waveform.

As described above, according to the invention, a pressure variation graph is displayed independently of reference pressure waveforms of the same screen, so that a display scale for the pressure deviation can be set independently of that for the reference pressure waveform. Thus, the pressure deviation can be displayed in a easy-to-read form on the screen.

Moreover, on the pressure variation graph the reference pressure waveform is displayed corresponding to the time of acquisition of its pressure data, and the zero pressure deviation is represented by a straight line. Thus, when the pressure deviation takes any other value than zero at a certain point of time, it is displayed off the straight line by a distance corresponding to its value, so that the operator can readily know of what time and to what extent the pressure deviation occurs. Further, if graphs for pressure deviations in a plurality of injection molding cycles are displayed overlapping on one another, the distribution of variations in the pressure deviation and specific times when the pressure deviation occurs, can be made known. Thus, the causes of abnormal pressures can be estimated from information of such special time points.

BRIEF DESCRIPTION OF THE DRAWINGS

The foregoing and other objects and features of the invention will become apparent from the following description of preferred embodiments of the invention with respect to the accompanying drawings, in which.

DETAILED DESCRIPTION OF THE PREFERRED EMBODIMENTS

Figure 1:
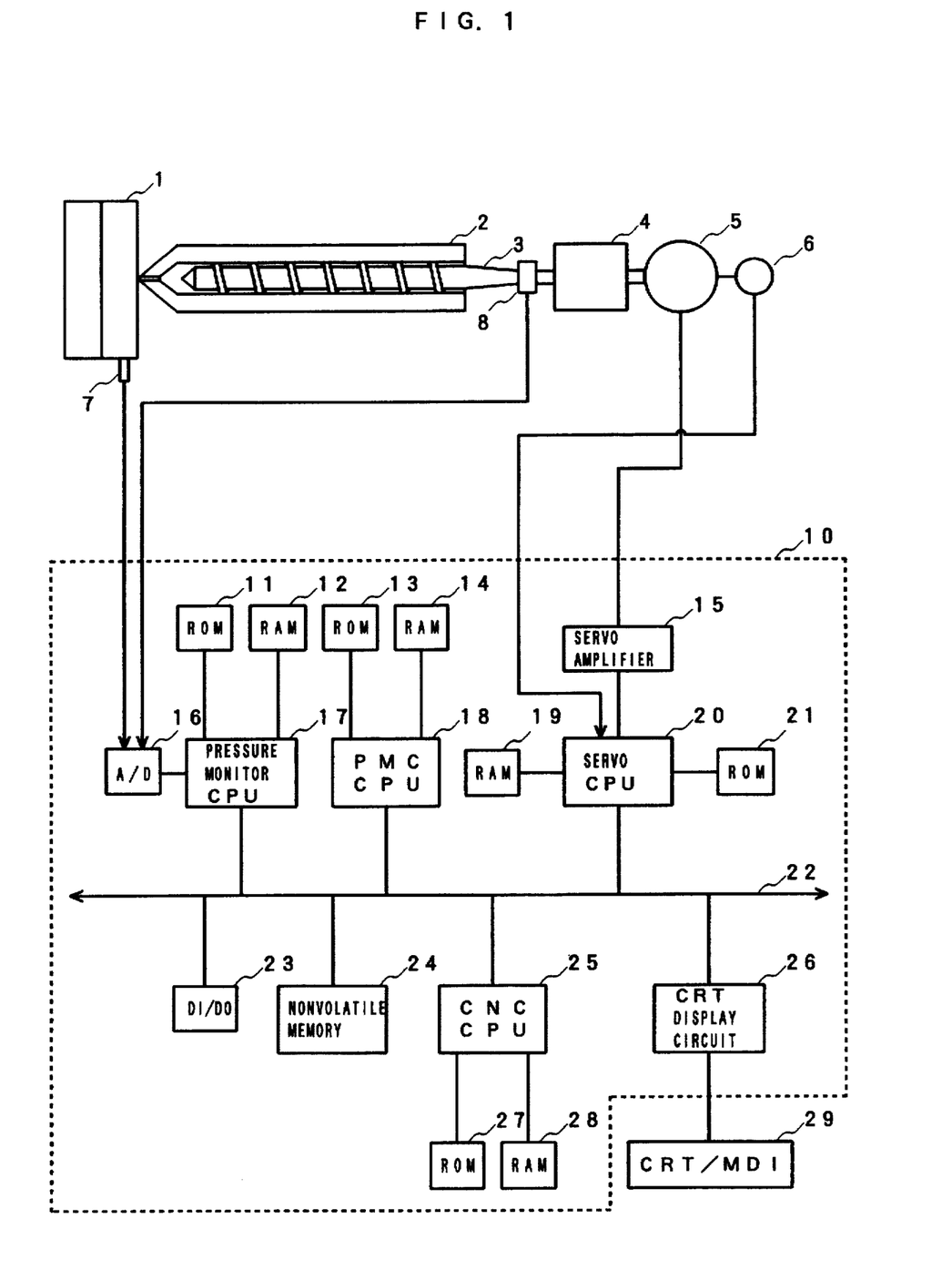
FIG. 1 is a block diagram showing the principal part of a motor-operated injection molding machine according to an embodiment to which a pressure data display method of the present invention is applied.

Referring to FIG. 1, an injection screw 3 of a motor-operated injection molding machine is driven along an injection axis by an injection servomotor 5 through a power transmission mechanism 4 which converts a rotatory motion of the screw 3 into a linear motion.

A load cell 8 is a pressure sensor which is located between the output shaft of the power transmission mechanism 4 and the screw 3, and is used to detect a reaction force of resin, i.e., injection pressure or back pressure, which act on the screw 3 at the time of injection or metering operation. Although a die internal pressure sensor 7 for the die may be used in some cases where a resin pressure acting on an injection molding die 1 has to be detected directly, it is not advisable to use the sensor 7 as back pressure detecting means. Furthermore, as the means for detecting both the injection pressure and back pressure, a cylinder internal pressure sensor which is attached to the inside of the distal end of a cylinder 2 may be used besides the load cell 8.

The above-described construction is generally known in connection with a conventional motor-operated injection molding machine.

A control device 10 for controlling the operation of the injection molding machine comprises a CNCCPU 25 as a microprocessor for numerical control, a PMCCPU 18 as a microprocessor for a programmable machine controller, a servo CPU 20 as a microprocessor for servo control, and a pressure monitoring CPU 17 for detecting the injection pressure and the like from the load cell 8 and the die internal pressure sensor 7 through an A/D converter 16 and executing a sampling processing, whereby information can be transferred among the microprocessors through a bus 22 by selecting inputs and outputs to be delivered to and received from one another.

The PMCCPU 18 is connected with a ROM 13, which is stored with sequence programs for controlling the sequential operation of the injection molding machine, and a RAM 14 for the temporary storage of computation data and the like.

The CNCCPU 25 is connected with a ROM 27, which is stored with control programs for generally controlling the injection molding machine, and a RAM 28 for the temporary storage and the like of computation data.

The servo CPU 20 is connected with a ROM 21 loaded with an exclusive control program for servo control and a RAM 19 for the temporary storage of data. Also, the pressure monitoring CPU 17 is connected with a ROM 11 loaded with a control program relating to a sampling processing for injection pressure and the like and a RAM 12 for the temporary storage of data. Moreover, the servo CPU 20 is connected with servo amplifiers which individually drive servomotors for various axes for mold clamping, injection, screw rotation, ejector operation, etc. in accordance with commands from the CPU 20, whereby outputs from pulse coders which are attached individually to the servomotors for the individual axes can be fed back to the servo CPU 20. The respective present positions, moving speeds, etc. of the individual axes are computed by means of the servo CPU 20 in accordance with pulses fed back from the pulse coders. FIG. 1 shows only the servomotor 5 for the injection axis from among the servomotors for various axes. The servomotor 5 is connected with a servo amplifier 15 and a pulse coder 6. Likewise, the servomotors for mold clamping and ejector operation are connected with a servo amplifier and a pulse coder respectively. However, the servomotor for screw rotation need not detect the present position, and is required to detect only the speed.

An interface 23 is an input/output interface which is used to receive signals from limit switches and a control panel arranged on various parts of the body of the injection molding machine and to transmit various commands to the peripheral equipment of the machine and the like.

A manual data input device 29 with display is connected to the bus 22 through a CRT display circuit 26, and can be used for graphic display on the screens, selecting function menus, and inputting various data. The device 29 is also provided with ten-keys for numerical data entry, various function keys, etc.

A nonvolatile memory 24 is a memory for storing molding data such as molding conditions, various set values, parameters, macro variables, etc. relating to injection molding operation.

The present invention, which is characterized by graphic display of pressure deviation, can also be applied to the display for monitoring both the injection pressure and the back pressure during metering operation. Here, however, description will be made taking an example of the case of graphic display of deviation of the injection pressure (in this case, therefore, the load cell 8, die internal pressure sensor 7, cylinder internal pressure sensor, etc. can be used individually as pressure detecting means).

Figure 5:
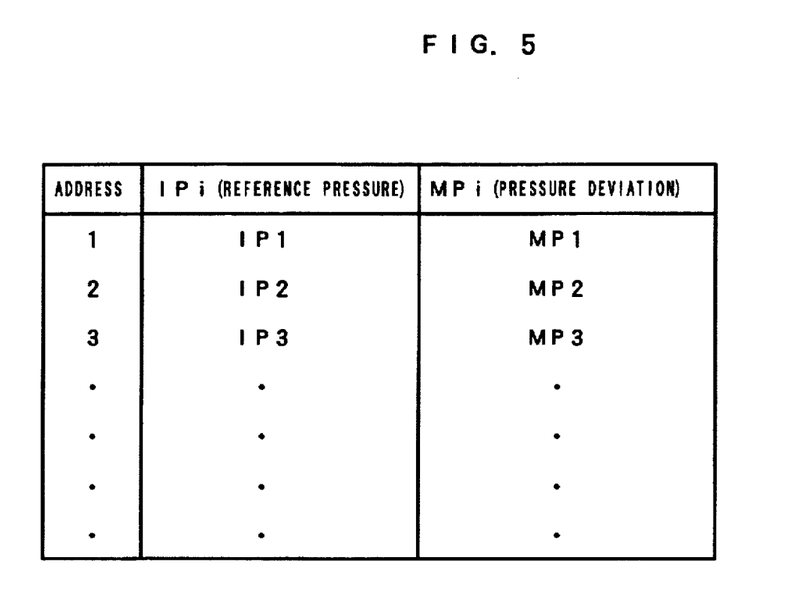
FIG. 5 is a diagram schematically illustrating a table and a file for storing data.

FIG. 5 is a schematic diagram showing an example of a data file which is provided in the nonvolatile memory 24 in order to store pressure waveform data, that is, waveform data of the injection pressure, as a reference for the injection molding operation. This data file is loaded with reference values of the injection pressure for various points of time after the start of injection in a manner such that the respective addresses of storage regions correspond to the time axis. As will be described in detail later, in this embodiment, the injection pressure is sampled to extract reference waveform data of the injection pressure in an injection stage in which conforming article is obtained. In this case, if the time for the start of injection is 0 and sampling period $\Delta t$, respectively, a reference pressure $IPi$ obtained after the lapse of $(i-1) \cdot \Delta t$ from the start of injection is stored in a storage region of an address i of the data file.

In this arrangement, the PMCCPU 18 generally controls the sequential operation of the injection molding machine; the CNCCPU 25 distributes pulses to the servomotors for the individual axes in accordance with the control programs of the ROM 27 and the molding conditions and other data in the nonvolatile memory 24; and the servo CPU 20 performs servo control, such as position loop control, speed loop control, current loop control, etc., in accordance with move commands pulse-distributed to the axes and position and speed feedback signals detected by detectors such as pulse coders and the like. Thus, the so-called digital servo processing is executed to control the operation of each servomotor.

Figure 2:
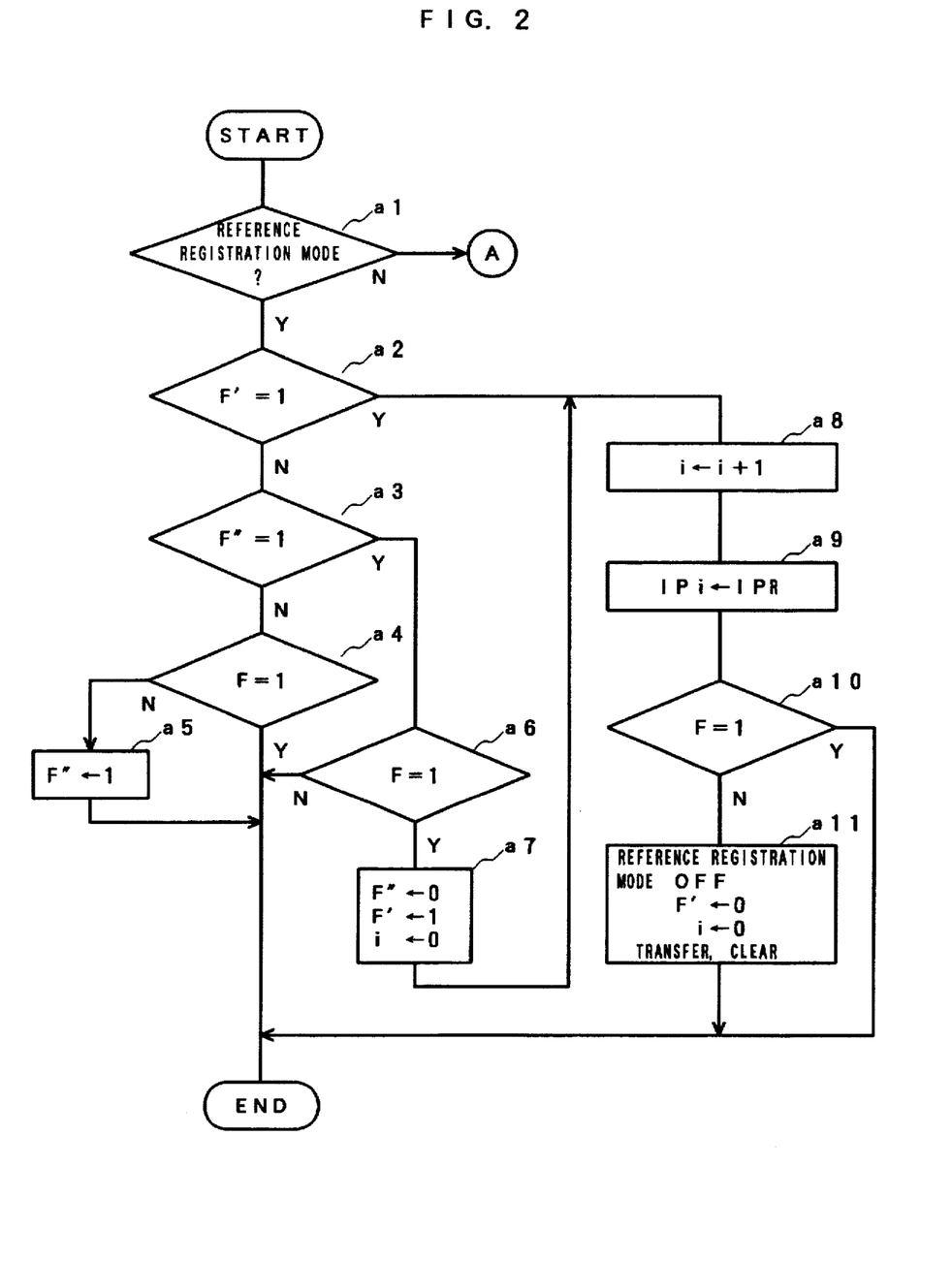
FIG. 2 is a flowchart showing an outline of a pressure waveform setting processing executed by a control device of the injection molding machine of FIG. 1.

FIG. 2 is a flowchart showing an outline of a "pressure waveform setting processing" for extracting the reference injection pressure waveform data and loading the data file therewith. This processing is repeatedly executed with every predetermined sampling period Δt by the pressure monitoring CPU 17 during the operation of the injection molding machine.

After starting the "pressure waveform setting processing", the pressure monitoring CPU 17 first determines whether or not a function menu "reference register mode" is selected (Step a1). Only in the case where this function menu is selected, the processing of Step a2 and following processings are executed in succession. Thus, the "pressure waveform setting processing" is executed only when the function menu "reference registration mode" is selected. In the case where the function menu "reference registration mode" is not selected, it is determined in the decision processing of Step b1 whether or not a "monitor processing" is to be executed. The "monitor processing" will be described later in detail.

Since the "pressure waveform setting processing" is a processing for setting a reference pressure waveform in computing the pressure deviation, it is preferred to be executed when a conforming article is molded. The operator is expected to select the "reference register mode" or a "monitor mode" by operating the function keys of the manual data input device 29 with a display during continuous molding operation.

When the function menu "reference register mode" is selected, that is, when the decision in Step a1 is "Yes", the pressure monitoring CPU 17 then determines whether or not a sampling execution flag F' is set (Step a2). Immediately after the function menu "reference register mode" is selected, the flag F' executing sampling is not set yet, so that the pressure monitoring CPU 17 further determines whether or not an injection start detection flag F" is set (Step a3). Moreover, immediately after the function menu "reference register mode" is selected, the injection start detection flag F" is not set either, so that the pressure monitoring CPU 17 further accesses the RAM 14 of the PMCCPU 18, and determines whether or not an injection execution flag F is set (Step a4). Since injection execution flag F is a flag which is set when an injection stage start command is delivered from the PMCCPU 18 which serves for the general sequence control, even at this point of time, the flag F may or may not be set. More specifically, the flag F can be considered to have been set if the injection stage for a certain molding cycle has already been started when the function menu "reference register mode" is selected by the operator. On the other hand, the flag F is not set if the injection stage has not been started yet when the function menu "reference register mode" is selected.

In the case where the injection execution flag F is already set, data cannot be extracted during a period from the start of injection to the flag setting if the extraction of sampling data is started while the flag F is set. Without starting the extraction of the sampling data at this point of time, the pressure monitoring CPU 17 keeps from executing the sampling processing in this molding cycle, thereby finishing processing in the processing period concerned. Then, the CPU 17 stands ready for the start of the injection stage in the next molding cycle.

On the other hand, if the injection execution flag F is not set, it implies that the injection stage has not been executed yet when the function menu "reference register mode" is selected by the operator. Naturally, therefore, the sampling processing in the injection stage cannot be executed, so that the pressure monitoring CPU 17 sets the injection start detection flag F" (Step a5), and stands ready for the start of the injection stage in the next molding cycle. Thus, if setting of the injection execution flag F is detected in a sampling period after setting of the injection start detection flag F" is completed in the previously described manner, the moment that the injection execution flag F shifts from OFF to ON, that is, initiation of the injection stage, can be detected.

In the case where the injection stage has already been started when the function menu "reference register mode" is selected by the operator, only the decision processings of Steps a1 to a4 are repeatedly executed until the injection stage is completed. After the injection start detection flag F" is set in the processing of Step a5 on completion of the injection stage, only the decision processings of Steps a1 to a3 and Step a6 are repeatedly executed until the processings of the next injection stage are started. In the case where no processing of the injection stage is started when the function menu "reference register mode" is selected by the operator, the injection start detection flag F" is then set in the processing of Step a5, as mentioned before. Thereafter, only the decision processings of Steps a1 to a3 and Step a6 are repeatedly executed in the same manner as aforesaid. The content of the processing of Step a6 is substantially the same as that of the processing of Step a4.

When the next injection stage is started while the pressure monitoring CPU 17 is repeatedly executing the decision processings of Steps a1 to a3 and Step a6, the PMCCPU 18 sets the injection execution flag F, and the CPU 17 detects this in the decision processing of Step a6. Thus, the initiation of the injection stage is detected. Thereupon, the pressure monitoring CPU 17 resets the injection start detection flag F", sets the sampling execution flag F', and initializes an address index i for determining the storage region of the sampling data at zero (Step a7), thereby then starting the sampling processing for a present value IP$_R$ of the injection pressure. The configuration of a table in the RAM 12 for the temporary storage of the sampling data is similar to that of the data file shown in FIG. 5.

After starting the sampling processing, the pressure monitoring CPU 17 first increments the value of the address index i by 1 (Step a8), reads the present value IP$_R$ of the injection pressure from the load cell 8, and stores it in a storage region IPi of the table in the RAM 12 so that the value IP$_R$ corresponds to the value of the address index i (Step a9). Then, the CPU 17 determines whether or not the injection execution flag F is reset, that is, whether or not one injection stage in a certain molding cycle is completed (Step a10). If this stage is not completed, the "pressure waveform setting processing" in the processing period concerned is finished as it is. Resetting of the injection execution flag F, like its setting it, is carried out by the PMCCPU 18, and has no direct connection with the operation of the pressure monitoring CPU 17.

In the subsequent processing periods, the sampling execution flag F' is already set in the processing of Step a7, so that only the decision processings of Steps a1 and a2 and the processings of Steps a8 to a10 are repeatedly executed. Thus, based on the gradually incremented value of the address index i, the present values $IP_R$ of the injection pressure for the individual sampling periods are successively stored in their corresponding storage regions IPi of the table in the RAM 12.

When it is detected in the decision processing of Step a10 that the injection execution flag F is reset by the PMCCPU 18 and that the injection and dwell control in the injection stage concerned is finished, the pressure monitoring CPU 17 cancels the selection of the function menu "reference register mode", to reset the sampling execution flag F', and initializes the value of the address index i. Then, the CPU 17 transfers all the data stored in the table in the RAM 12 to the data file of the nonvolatile memory 24, and erases the data in the table (Step a11).

According to the embodiment described above, various values of the sampling data IPi of the injection pressure obtained in the injection stage in which conforming article is obtained are directly set and stored as reference pressure waveform data in the control device 10. However, in carrying out pressure control in the injection stage based on the reference pressure waveform data, these data may be modified or edited, and the modified or edited data may be stored to update the data file of the nonvolatile memory 24. The modification or editing may be effected in a manner such that the data transferred to the nonvolatile memory 24 are rewritten by direct numerical input operation by means of the ten-keys or the like, or that a diagram obtained by plotting the data is displayed on the manual data input device 29 with display unit, it is transformed by operation using a graphic cursor, and the transformed diagram is digitized again and automatically recorded as data in the position corresponding to position of the previous data file. In either case, the data editing method itself comes within a conventional art, so that a detailed description of this method is omitted.

Figure 3:
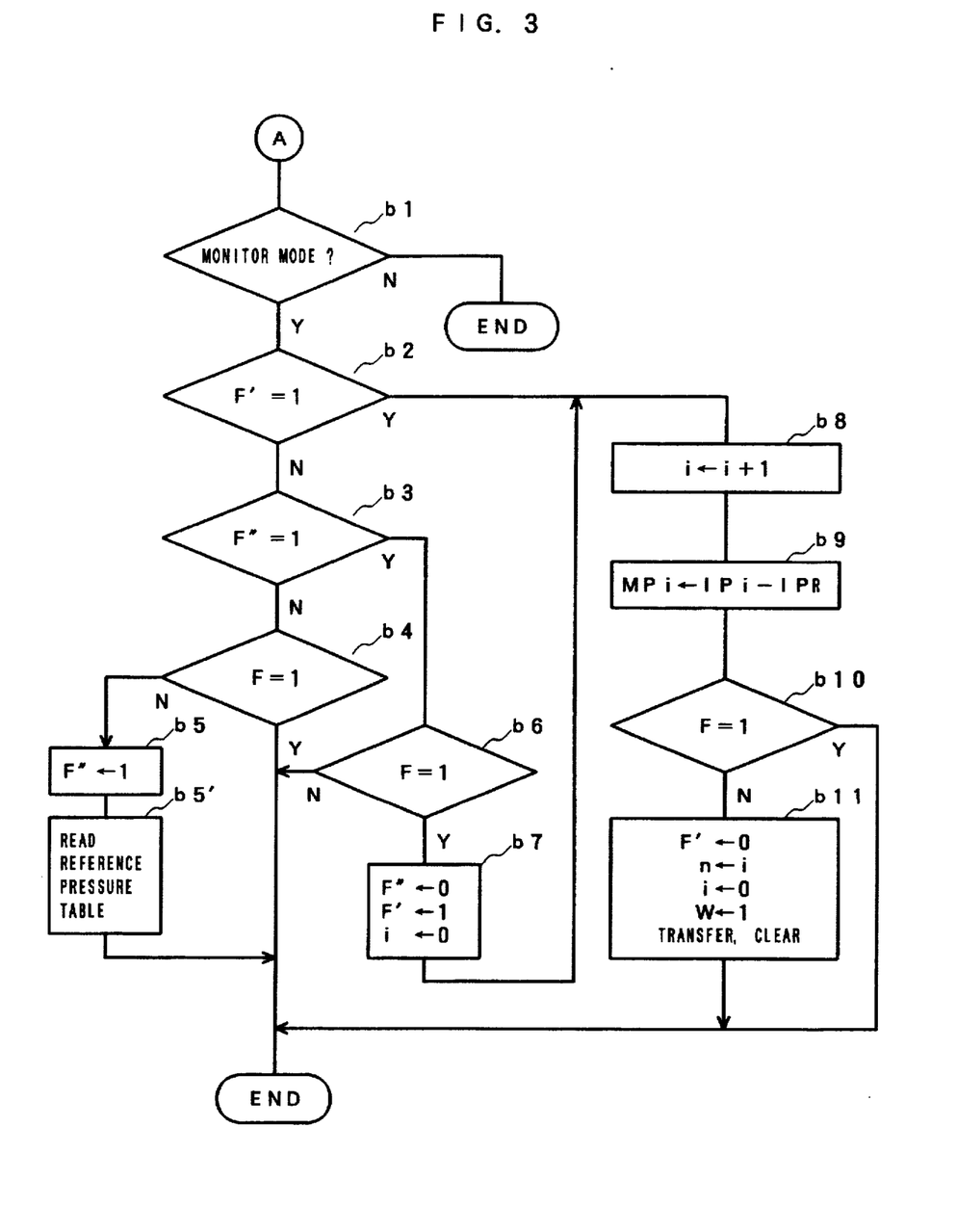
FIG. 3 is a flowchart showing an outline of a monitor processing executed by the control device of the injection molding machine of FIG. 1.

FIG. 3 is a flowchart showing an outline of the "monitor processing" for obtaining deviations between the values of the injection pressure at various detection times in the injection stage on the basis of the reference pressure waveform data obtained in the aforesaid manner. This processing, like the "pressure waveform setting processing", is repeatedly executed with every predetermined sampling period Δt by the pressure monitoring CPU 17 while the function menu "monitor mode" is selected.

Figure 6:
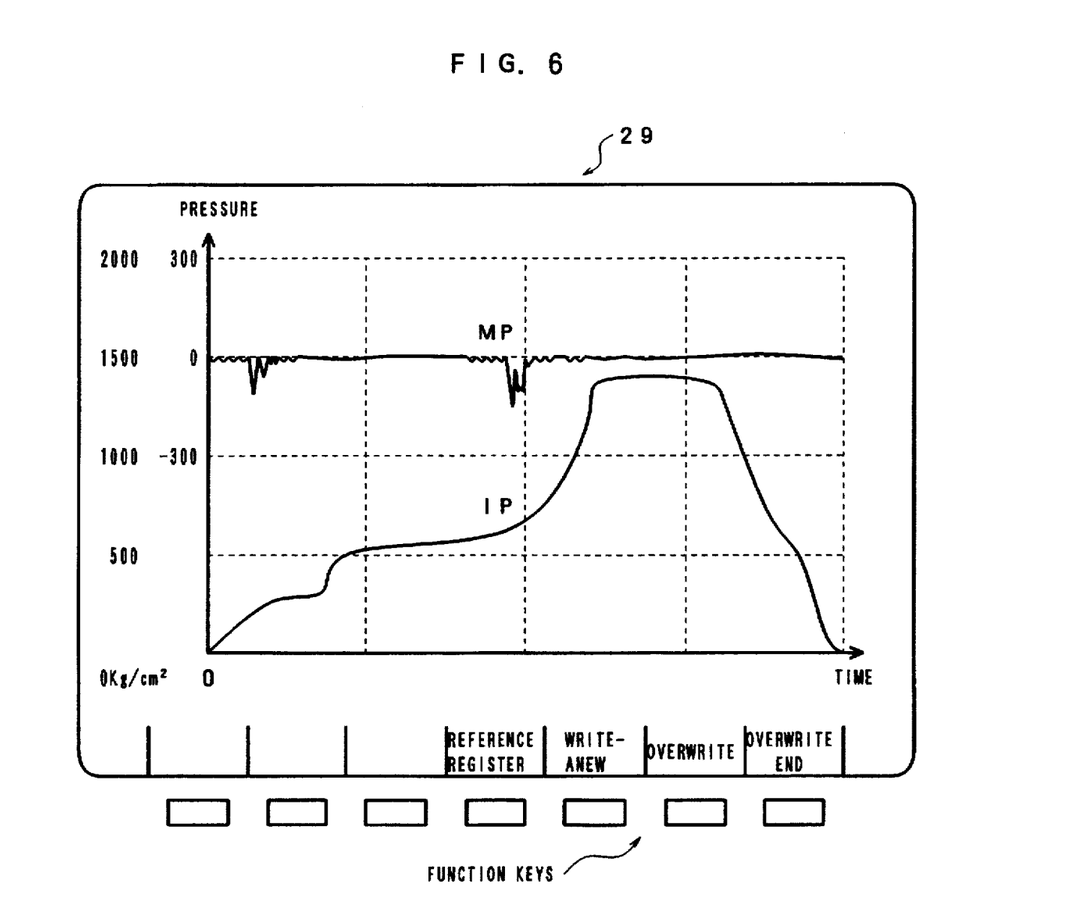
FIG. 6 is a diagram illustrating a graph displayed by the display processing according to the embodiment.

When the function menu "monitor mode" is selected, the screen display of the manual data input device 29 is changed, whereupon a diagram IP of the reference injection pressure waveform, which is based on the reference pressure data IPi stored in the nonvolatile memory 24, and display scales for the reference injection pressure and the pressure deviation are drawn in the manner shown in FIG. 6. (A graph MP of the pressure deviation is not displayed in this stage.) The display scale of the reference injection pressure waveform IP is fixed or automatically determined by conventional automatic scaling processing. In the illustrated example, the scale is set covering a range from 0 to 2,000 kg/cm² graduated by 500 kg/cm². The origin of pressure of the display scale for the pressure deviation is set at a position, which is offset to the position of 1,500 kg/cm² with respect to the display scale of the reference injection pressure, so that the pressure deviation zero line does not interfere with the reference injection pressure waveform IP. However, each division of the display scale for the pressure deviation represents 300 kg/cm²; that means it is ⅗ times as large as each division of the display scale for the reference injection pressure. This enlargement ratio can be set optionally and changed freely by ten-key operation or the like on the manual data input device 29 with a display. As the enlargement ratio is changed, the scale display of the pressure deviation display is also changed automatically. If the enlargement ratio is 2, for example, each division of the scale becomes 250 kg/cm². The time axis is common to the two cases. Operations of function keys "write-anew", "overwrite", "overwrite end", etc. in the monitor mode are temporarily latched in a buffer in the CRT display circuit 26, and the operation state of the keys can be checked by means of the CPUs.

On starting the "monitor processing," the pressure monitoring CPU 17 first determines whether or not the function menu "monitor mode" is selected (Step b1), and executes the processing of Step b2 and the following processings in succession only when this function menu is selected. Thus, the substantial "monitor processing" can be carried out only in the case where the function menu "monitor mode" is selected.

The processings of Steps b2 to b5 and Steps b6 and b7, like the processings of Steps a2 to a5 and Steps a6 and a7 in the aforesaid "pressure waveform setting processing", serve to start sampling of the present values $IP_R$ of the injection pressure from the point of time immediately after the start of injection. In this "monitor processing," however, a processing (Step b9) for obtaining values of pressure deviation MPi at various detection times must be executed in accordance with the reference pressure waveform data IPi and the present values $IP_R$ of the injection pressures at the individual detection times. It is necessary, therefore, to fetch the reference pressure waveform data from the data file of the nonvolatile memory 24 and store them in the data table in the RAM 12 in advance. This processing is executed in Step b5' at the point of time immediately after the function menu "monitor mode" is selected or at the time immediately before the processing of injection/dwell stage is completed.

After detecting the initiation of a new injection stage (Steps b2 to b6), the pressure monitoring CPU 17 resets the injection start detection flag F", sets the sampling execution flag F', and executes a processing (Step b7) for initializing the address index i. Then, the CPU 17 increments the value of the index i by 1 (Step b8), reads the reference value IPi of the injection pressure corresponding to the sampling period concerned from the data table in the RAM 12 in accordance with the value of the index i, and reads the present value $IP_R$ of the injection pressure from the load cell 8. Then, the CPU 17 obtains the value of the pressure deviation for the sampling period i concerned by subtracting the present value $IP_R$ from the reference injection pressure IPi, and stores this value as the pressure deviation MPi in a storage region of an i'th address of the data table in the RAM 12 (Step b9).

Subsequently, the pressure monitoring CPU 17 determines whether or not the injection execution flag F is reset, that is, whether or not one injection stage in the molding cycle is completed (Step b10). If this stage is not completed, the "monitor processing" in the processing period concerned is finished in this state.

In the subsequent processing periods, the sampling execution flag F' is already set in the processing of Step b7, as described previously, so that only the decision processings of Steps b1 and b2 and the processings of Steps b8 to b10 are repeatedly executed. Thus, based on the gradually incremented value of the address index i, the values of pressure deviations between injection pressures for the individual sampling periods i are successively stored in their corresponding storage regions MPi of the table in the RAM 12.

When it is detected in the decision processing of Step b10 that the injection execution flag F is reset by the PMCCPU 18 and that the injection and dwell control in the injection stage concerned is finished, the pressure monitoring CPU 17 resets the sampling execution flag F', and transfers the final value of the address index i, that is, the number of times of executed cycles of sampling, to a register n. Thereafter, the CPU 17 initializes the value of the address index i, and sets a display execution flag W. Then, the CPU 17 transfers the number of times n of executed cycles of sampling and all the pressure deviation data stored in the table to the nonvolatile memory 24 to be stored in the data file, and erases the pressure deviation data in the RAM 12 (Step b11).

While the function menu "monitor mode" is selected, the "monitor processing" continues to be executed, so that pressure deviation data MP1 to MPn for each injection stage are transferred to the data file of the nonvolatile memory 24 with every termination of one injection stage.

Figure 4:
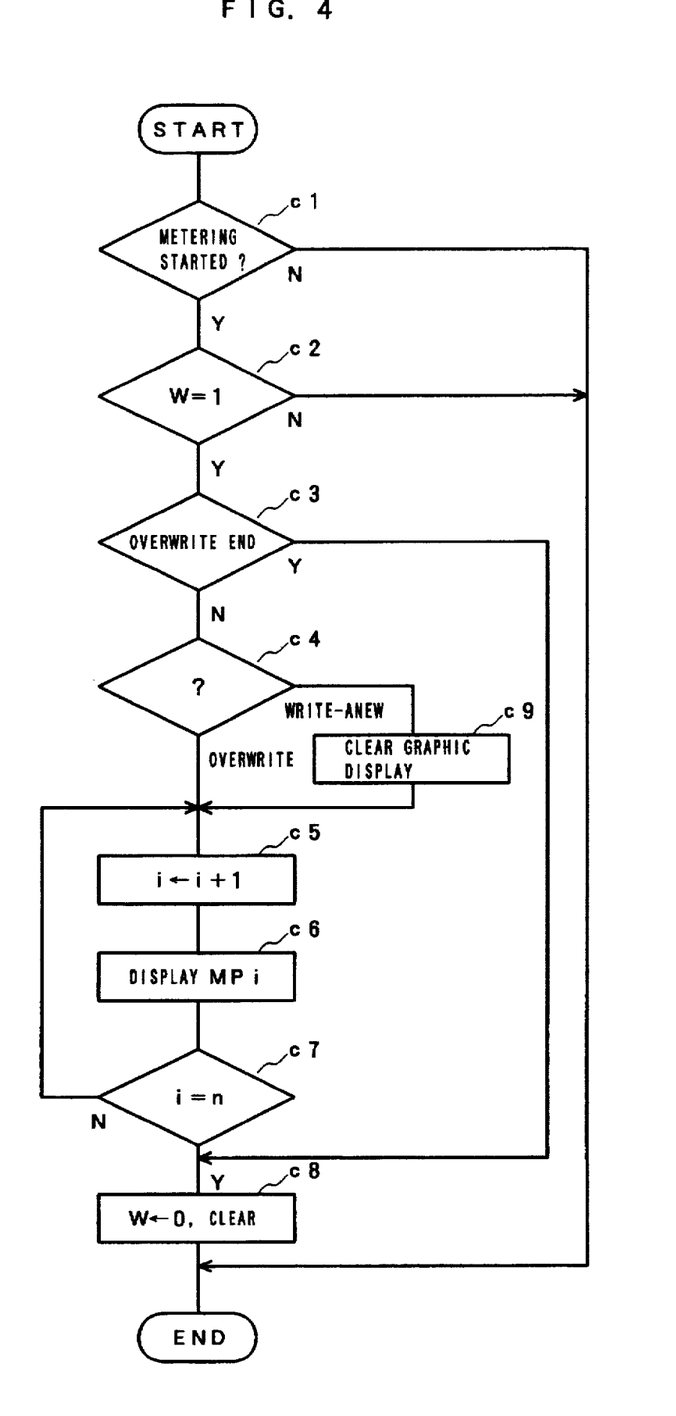
FIG. 4 is a flowchart showing an outline of a display processing executed by the control device of the injection molding machine of FIG. 1.

FIG. 4 is a flowchart showing an outline of a "display processing" executed by the PMCCPU 18 at the start of metering, in accordance with the pressure deviation data MP1 to MPn obtained in the "monitor processing". Since sampling processing for detecting the back pressure during metering operation is not executed in the case of the present embodiment, the pressure monitoring CPU 17 may be designed so as to be able to carry out a processing equivalent to the "display processing" on completion of the processing of Step b11 in the "monitor processing".

After starting the "display processing" by initiating the metering operation (Step c1), the PMCCPU 18 first determines whether or not the display execution flag W is set (Step c2). In the case where the function menu "monitor mode" is selected in the middle of an injection stage, as mentioned before, the injection pressure sampling processing for this injection stage is non-executable. Since the display execution flag W is not set either, in this case, the processing of Step c3 and the subsequent processings in the "display processing" are also automatically canceled. In other words, the "display processing" is executed only when the display execution flag W is set, that is, only in the case where the function menu "monitor mode" is selected and the pressure deviations are computed based on the "monitor processing" during the whole period of the immediately preceding injection stage.

If the display execution flag W is concluded to be set, the PMCCPU 18 determines whether or not a command for "overwrite end" is delivered to the manual data input device 29 with a display (Step c3). If the command for "overwrite end" is inputted, the PMCCPU 18 resets the display execution flag W, and erases the pressure deviation data MP1 to MPn in the data file of the nonvolatile memory 24 (Step c8) to terminate the "display processing" for this cycle. In this case, therefore, neither a renewal display (writing-anew) of the pressure deviation graph nor an additional display (overwriting) of the graph is executed, and thus a graph or the like having so far been displayed is fixedly displayed on the display screen of the manual data input device 29 without change.

In the case where the display execution flag W is set, the PMCCPU 18 further determines whether the "overwrite" is selected or whether "write-anew" is selected (Step c4). If it is concluded that the "overwrite" has been selected, the PMCCPU 18 gradually increments the value of the address index i which has been initialized in the processing of Step b11 (Step c5) until the index value reaches the total number n of the data (Step c7), and reads the pressure deviation data MPi from the data file of the nonvolatile memory 24 on the basis of each value of the index i. Then, the PMCCPU 18 displays dots at positions of [time, pressure deviation]=[(i−1)·Δt, MPi], on the display screen (Step c6), and produces and displays or additionally displays the graph MP as shown in FIG. 6. In the case where "write-anew" has been selected, the PMCCPU 18 erases the graph MP having so far been displayed on the display screen (Step c9; with IP left), and executes the same processing operation as aforesaid so that the updated pressure deviation graph MP for the immediately preceding injection stage is displayed (Steps c5 to c7). After finishing the processing for the graphic display of "overwrite" or "write-anew", the PMCCPU 18 resets the display execution flag W, and erases the pressure deviation data MP1 to MPn in the data file of the nonvolatile memory 24 (Step c8), whereupon the "display processing" for this cycle terminates.

This "display processing" is repeatedly executed with every start of the metering operation for each molding cycle as long as the function menu "monitor mode" is selected. In the case where the function for "overwrite" is selected, therefore, the pressure deviation graphs MP for all the injection stages after the selection of the function menu "monitor mode" are successively displayed overlapping one another. In the case where the function "write-anew" is selected, on the other hand, only the pressure deviation graph MP for the immediately preceding injection stage is displayed on the display screen of the manual data input device 29 until the metering operation for the next injection stage is started. In either case, when the command "overwrite end" is inputted from the manual data input device 29 with a display, the updated display or additional display of the graphs in the next and subsequent molding cycles can be canceled so that the currently displayed graph can be maintained as it is. This is convenient in the case where the graph should be fixed for examination. In starting "overwrite" after once erasing the preceding graphic display, it is necessary only that the function menu "monitor mode" be selected and "overwrite" be specified.

The pressure deviation graphs MP displayed in this manner, as shown in FIG. 6, represent vertical variations in pressure as compared with a straight line for the zero pressure deviation as a reference, so that the relations between the pressure deviations at the individual detection times can be observed with ease. For example, these graphs can be used very conveniently for reading the injection time at which the maximum pressure deviation occurs, because the extent of the pressure deviation is indicated in the vertical direction with respect to the horizontal straight line for the zero pressure deviation, that is, the relation between the pressure deviations at various detection times can be compared by degree of deviation on the same straight line. This is one of analytical effects which cannot be easily obtained in the case where a display format such that a reference diagram itself involves vertical variations, as in the prior art example shown in FIG. 7.

The pressure deviation graph MP can be displayed independently of the reference pressure waveform IP, and so, even in the case where the value of the reference pressure waveform is so large that the unit of the divisions of the display scale for the reference pressure waveform has to be enlarged in order to display the waveform IP, the display scale for the pressure deviation graph MP will not be influenced by the enlarged division unit of the scale, so that even delicate fluctuations of the pressure deviation can be displayed so as to be legible by proper scale setting. Furthermore, since the graphs of the reference pressure waveform IP and the pressure deviation MP are displayed in parallel on the display screen with reference to the time of detection, the time of the occurrence of variations in pressure can easily be observed corresponding to the reference pressure waveform IP. In the present embodiment, the graphs of the reference pressure waveform IP and the pressure deviation MP are displayed with reference to the time axis. Alternatively, however, the reference pressure waveform IP and the pressure deviation MP may be displayed in parallel with reference to the screw position.

If the function for "overwrite" is specified so that the pressure deviation graphs MP for a plurality of injection molding cycles are displayed superposed on one another, causes of abnormal pressure can be estimated by examining the distribution of variations in the pressure deviation MP, the times of detection at which the variations occurs repeatedly, etc. If the variations in the pressure deviation MP are always large and substantially fixed in the degree of deviation of fixed time of detection in a plurality of injection stages, for example, injection failures may be considered to have been caused by some defect in the die design or the like. If the variations in the pressure deviation MP are large and fluctuate drastically, injection failures may possibly have been caused by inappropriate setting of injection conditions. In the case where there is a dispersion in the pressure deviation MP but the time at which the dispersion occurs is not repeated continuously, such dispersion can be considered to have been caused by partially poor plasticization of the resin or the inclusion of the foreign matter, and not necessarily caused by the construction of the mold itself or the setting of molding conditions. Tracking of the causes of such injection failures requires operator's experiences, knowledge, etc., and cannot be solved by rationalization of the display scale for the pressure deviation MP and improvement of the resolution alone. Nevertheless, considering that these display data can be a clue to the detection of the causes, it is natural that graphic display with higher legibility is advantageous in tracking of the causes of injection failures.

What is claimed is:

1. A pressure data display method for an injection molding machine, comprising the steps of:
   (a) setting a reference injection pressure at every predetermined time in an injection molding operation, prior to starting the injection molding operation;
   (b) detecting the value of the injection pressure at every predetermined detection time corresponding to the time of said step (a) during the injection molding operation;
   (c) obtaining a deviation between the reference injection pressure and detected injection pressure at said detection time, based on the data of the reference injection pressure set in step (a) and the data of injection pressure in step (b); and
   (d) graphically displaying the deviation between the reference injection pressure for each said detection time and the detected injection pressure on a coordinate system having one axis on a display means representing the detection time and the other axis representing the pressure value;
   wherein said reference injection pressure set in said step (a) is displayed simultaneously on the coordinate system of the display means of said step (d) when the deviation between the reference injection pressure and the detected injection pressure is displayed on the coordinate system.

2. A pressure data display method for an injection molding machine according to claim 1, wherein said pressure value axis of the coordinate system on the display means for said deviation and the pressure value axis for the reference pressure are set separately with respect to the scale and zero position.

3. A pressure data display method for an injection molding machine according to claim 2, wherein said pressure value axis of the coordinate system on the display means is set so that a pressure value corresponding to the unit length thereof is smaller for display of the deviation than that for display of the reference pressure, and that the point thereon at which the deviation is zero is situated a little higher than the point for the maximum value of the reference pressure.

4. A pressure data display method for an injection molding machine according to claim 1, wherein a plurality of sets of said deviations obtained from the data of the reference injection pressure and a plurality of sets of data for injection pressures detected with every execution of a plurality of cycles of injection molding operation are displayed overlapping one another on the coordinate system on the display means.

5. A pressure data display method for an injection molding machine according to claim 1, wherein said time for setting the reference injection pressure in said step (a) and said time for detecting the injection pressure in said step (b) correspond to a predetermined period for sampling the injection pressure by means of a pressure sensor, so that said one and the other axes of the coordinate system on the display means represent time and pressure, respectively.

6. A pressure data display method for an injection molding machine according to claim 1, wherein said time for setting the reference injection pressure in said step (a) and said time for detecting the injection pressure in said step (b) are based on a screw position, so that said one and the other axes of the coordinate system on the display means represent the screw position and pressure.

7. A pressure data display method for an injection molding machine according to claim 1, wherein the value of said reference injection pressure for each predetermined time in said step (a) is set in accordance with the value of the injection pressure detected with every said predetermined time at which a conforming article is obtained by the injection molding operation.

8. A method of monitoring a molding failure in an injection molding machine, comprising the steps of:
   (a) obtaining a plurality of sets of data on detected injection pressure by carrying out injection molding operations a plurality of times;
   (b) calculating a plurality of sets of pressure deviation between a plurality of sets of data on detected injection pressure and a reference set of injection pressure;
   (c) detecting dispersion of said plurality of sets of pressure deviation; and
   (d) checking a molding failure using said detected pressure dispersion.

9. A pressure data display method for an injection molding machine, comprising the steps of:
   (a) setting a back pressure at every predetermined time in an injection molding operation, prior to starting the injection molding operation;
   (b) detecting the value of the back pressure at every predetermined detection time corresponding to the time of said step (a) during the injection molding operation;

(c) obtaining a deviation between the reference back pressure and detected back pressure at said detection time, based on the data of the reference back pressure set in step (a) and the data of back pressure detected in step (b); and (d) graphically displaying the deviation between the reference back pressure for each said detection time and the detected back pressure on a coordinate system having one axis on a display means representing the detection time and the other axis representing the pressure value;

wherein said reference back pressure set in said step (a) is displayed simultaneously on the coordinate system of the display means of said step (d) when the deviation between the reference back pressure and the detected back pressure is displayed on the coordinate system.

10. A pressure data display method for an injection molding machine according to claim 9, wherein said pressure value axis of the coordinate system on the display means for said deviation and the pressure value axis for the reference pressure are set separately with respect to the scale and zero position.

11. A pressure data display method for an injection molding machine according to claim 10, wherein said pressure value axis of the coordinate system on the display means is set so that a pressure value corresponding to the unit length thereof is smaller for display of the deviation than that for the display of the reference pressure, and that the point thereon at which the deviation is zero is situated a little higher than the point for the maximum value of the reference pressure.

12. A pressure data display method for an injection molding machine according to claim 9, wherein a plurality of sets of said deviations obtained from the data of the reference back pressure and a plurality of sets of data for back pressures detected with every execution of a plurality of cycles of injection molding operation are displayed overlapping one another on the coordinate system on the display means.

13. A pressure data display method for an injection molding machine according to claim 9, wherein said time for setting the reference back pressure in said step (a) and said time for detecting the back pressure in said step (b) correspond to a predetermined period for sampling the back pressure by means of a pressure sensor, so that said one and the other axes of the coordinate system on the display means represent time and pressure, respectively.

14. A pressure data display method for an injection molding machine according to claim 9, wherein said time for setting the reference back pressure in said step (a) and said time for detecting the back pressure in said step (b) are based on a screw position, so that said one and the other axes of the coordinate system on the display means represent the screw position and pressure.

15. A pressure data display method for an injection molding machine according to claim 9, wherein the value of said reference back pressure for each predetermined time in said step (a) is set in accordance with the value of the back pressure detected with every said predetermined time at which a conforming article is obtained by the injection molding operation.

16. A method of monitoring a molding failure in an injection molding machine, comprising the steps of:

(a) obtaining a plurality of sets of data on detected back pressure by carrying out injection molding operations a plurality of times;

(b) calculating a plurality of sets of pressure deviation between a plurality of sets of data on detected back pressure and a reference set of back pressure;

(c) detecting dispersion of said plurality of sets of pressure deviation; and (d) checking a molding failure using said detected pressure dispersion.

* * * * *